Dec. 29, 1953     H. C. RHODES     2,664,188
CONVEYING DEVICE

Filed March 27, 1950     3 Sheets-Sheet 1

INVENTOR.
HERBERT C. RHODES
BY
*T. H. Geisler*
ATTORNEY

Dec. 29, 1953     H. C. RHODES     2,664,188
CONVEYING DEVICE
Filed March 27, 1950     3 Sheets-Sheet 2
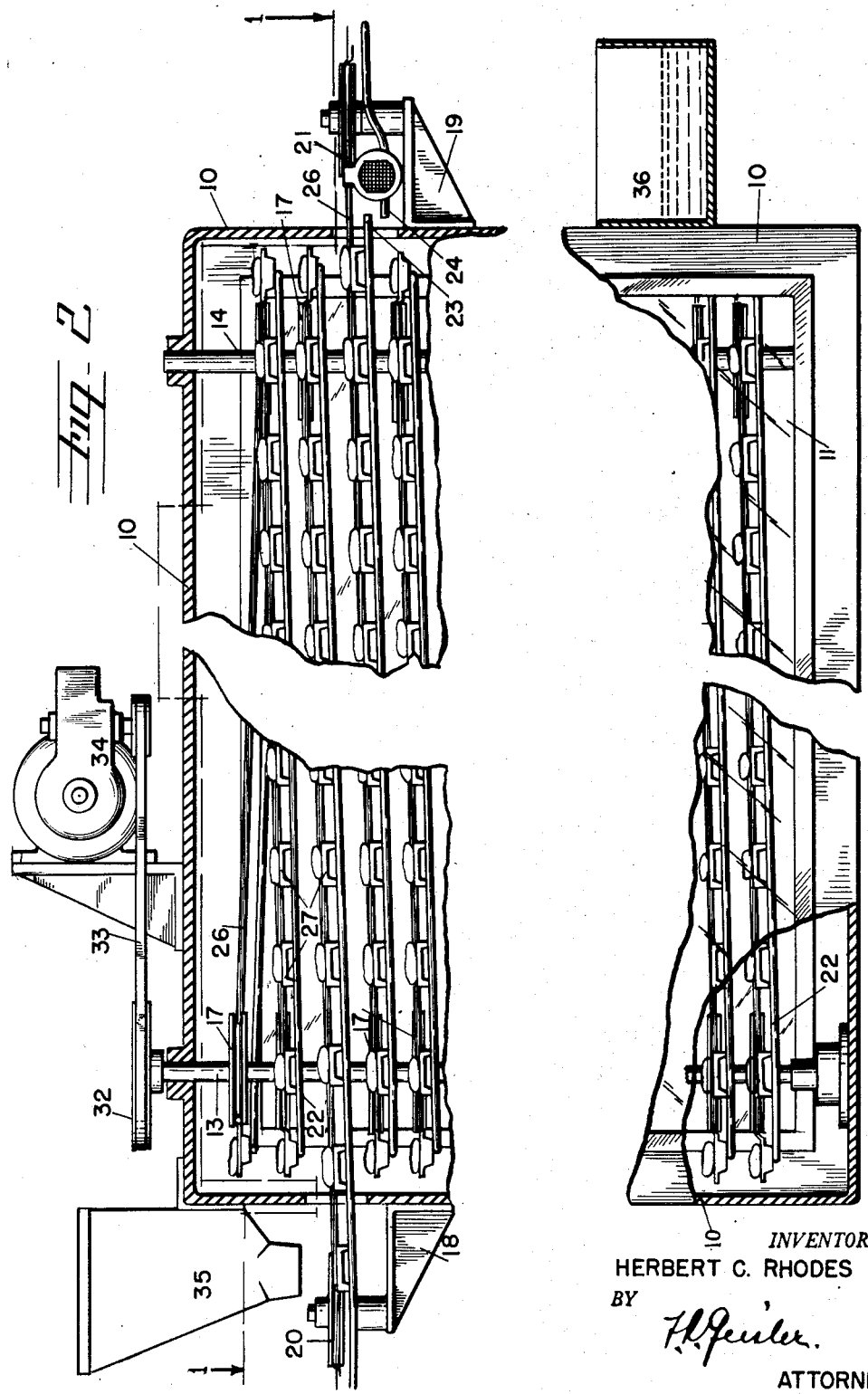
INVENTOR.
HERBERT C. RHODES
BY
ATTORNEY

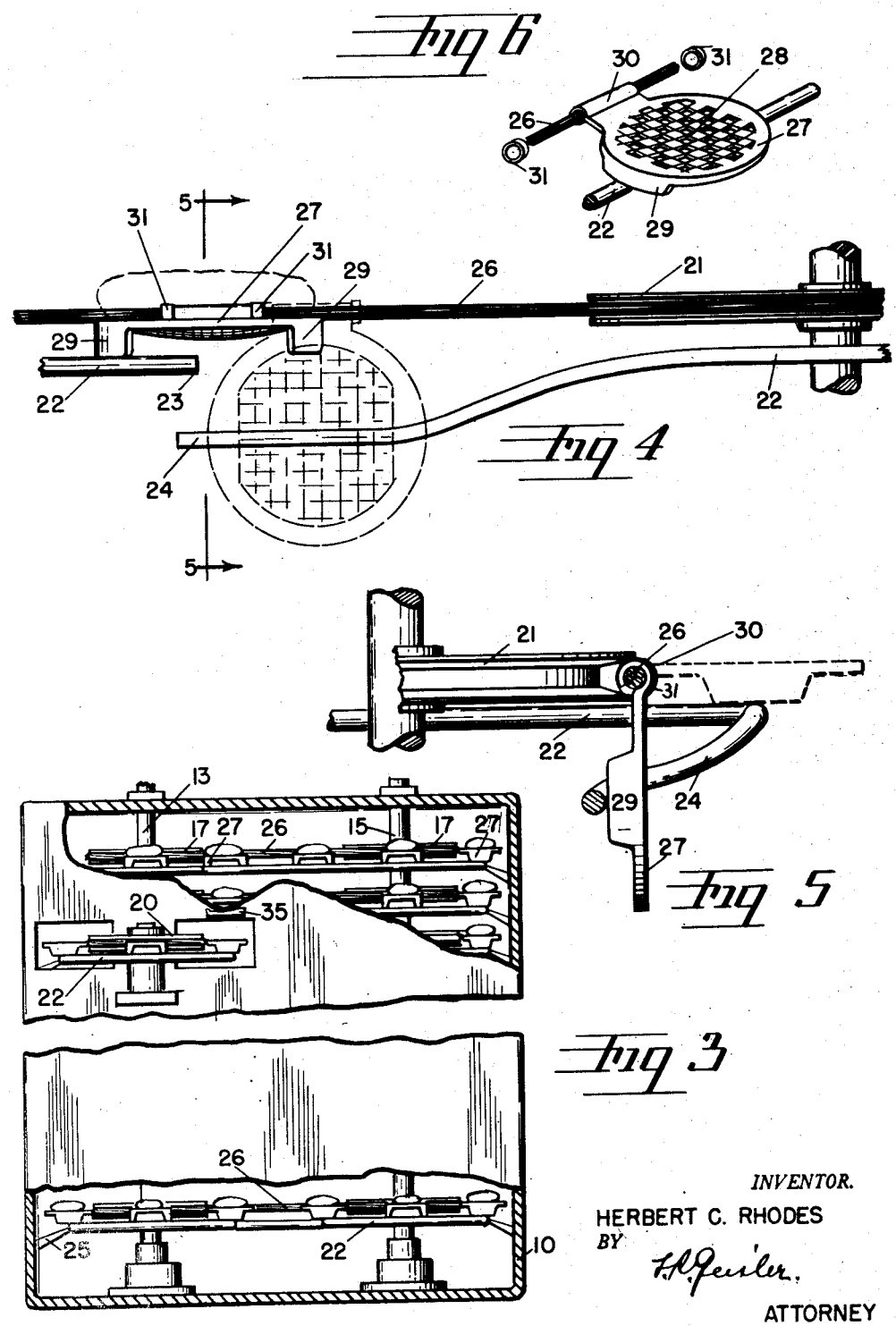

Patented Dec. 29, 1953

2,664,188

UNITED STATES PATENT OFFICE 2,664,188

CONVEYING DEVICE

Herbert C. Rhodes, Portland, Oreg.

Application March 27, 1950, Serial No. 152,037

3 Claims. (Cl. 198—147)

This invention relates to the manufacture of certain bakery products in which the dough, after being cut, formed or molded into the individual pieces required, is allowed to rise for a predetermined period of time, after which period the raised dough pieces are subjected to the final baking or frying. Permitting the dough to rise during a predetermined period is commonly known in the trade as "dough proofing."

In particular, the present invention relates to the manufacture of raised doughnuts in which the rings of doughnut dough are allowed to rise during a period, for example, of one-half hour or more, before the customary immersion in deep frying fat or oil.

Heretofore the customary procedure in bakeries in the making of raised doughnuts is to place the individual rings or pieces of dough on wire mesh trays, which trays are manually placed in proofing boxes or compartments and allowed to remain there for the desired length of proofing time. At the end of the proofing period the trays are again manually moved and the raised doughnut dough pieces then dropped into the deep frying fat or oil. In the placing of the individual dough pieces in the trays for proofing, some of the dough pieces will often inadvertently be placed in contact with others which may cause such pieces to stick together as well as to interfere with the symmetrical expansion of the individual contacting pieces.

When the molding and delivery of the doughnut rings is performed rapidly by modern bakery machinery, a large number of the individual dough pieces are accumulated in the course of the half hour or so required for the proper dough proofing or rising of the dough, and the handling of the accumulating pieces of dough during this stage by customary methods requires labor and care and a considerable amount of space.

An object of this invention is to provide improved means by which each individual dough piece will be taken care of mechanically and automatically throughout the entire proofing period.

A related object is to provide novel and practical means whereby each separate piece of dough will be allowed to proof individually without any possibility of being placed in contact with any other piece of dough, as might occur when several dough pieces are placed on a proofing tray.

Another object of this invention is to provide such a dough proofing device in which a maximum number of individual pieces of dough can be taken care of within a minimum amount of space during the proofing period.

A further object of this invention is to provide a device of the character indicated which can be made to suit particular requirements, which will be simple in construction, which will require a minimum amount of expense and care in maintenance, and which will require no particular skill in the handling of its operation.

The manner in which these objects and other advantages are attained by my invention will be readily understood from the following description of my dough proofing device with reference to the accompanying drawings, these drawings illustrating a preferred form in which my device is made.

In the drawings:

Fig. 2 is a sectional elevation on line 2—2 of Fig. 1;

Fig. 3 is a fragmentary end elevation, partly in section, taken from the left in Fig. 2;

Fig. 4 is an enlarged fragmentary elevation of a portion of the device shown on the right in Fig. 2 and illustrates in full lines one of the dough carriers arranged in dough-supporting position, and also indicates in broken lines the same dough carrier in subsequent discharging position;

Fig. 5 is a fragmentary sectional view taken on line 5—5 of Fig. 4, but illustrates in full lines a dough carrier in discharging position, and indicates in broken lines the same dough carrier subsequently restored to normal traveling or dough-carrying position; and Fig. 6 is a view in perspective of one of the dough carriers of the device.

Figure 1:
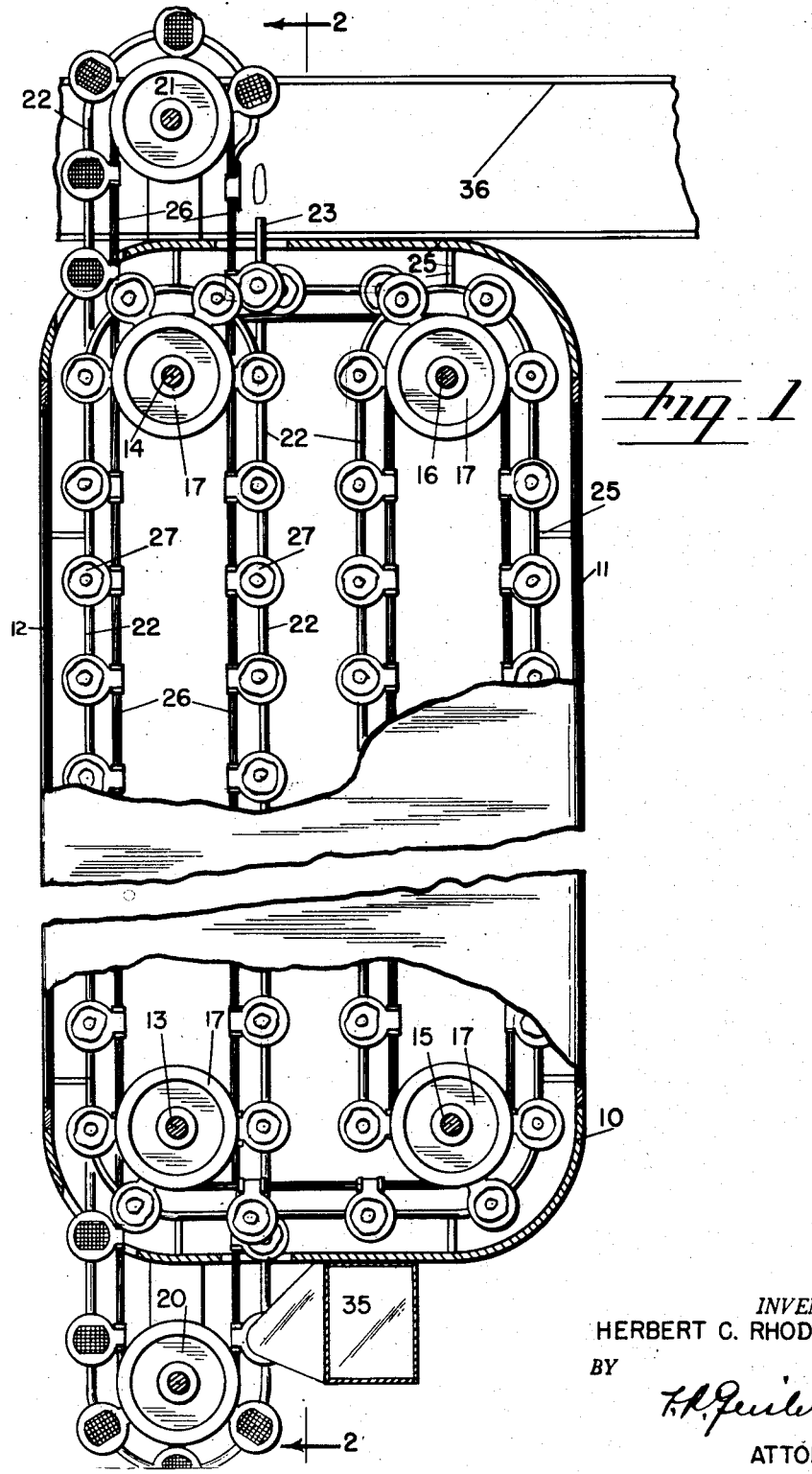
Fig. 1 is a sectional plan view on line 1—1 of Fig. 2.

While my device can be used for any individual pieces of dough which are delivered successively and which are each to be allowed to rise for a predetermined period while being retained in the device, the most important use of my invention will be found to be in the manufacture of raised doughnuts, as previously indicated, and thus my device will be described with specific reference to this particular use.

Referring first to Figs. 1 and 2, my device is confined mostly within a housing, indicated in general by the reference character 10, the shape and dimensions of which may be varied to suit conditions. Preferably the housing is substantially rectangular in plan, as indicated in Fig. 1, having side walls and bottom and top walls and having suitable windows or doors such as the windows 11 and 12, which can be opened to provide access to the interior.

Four vertcial shafts 13, 14, 15 and 16 are mounted in the housing and are rotatably supported in suitable journals and bearings at bottom and top walls of the housing. At least one of these vertical shafts, for example the shaft 13 (Fig. 2), extends up beyond the top of the housing and has a driving pulley 32 keyed to its upper end. The pulley 32 is arranged so as to be driven through a suitable belt connection 33 with a motor 34 mounted on top of the housing.

A plurality of identical pulleys 17 are keyed or otherwise secured to each of the shafts 13, 14, 15 and 16 in equally spaced position as indicated in Fig. 2, and similar pulleys 20 and 21 are located outside of the housing and are rotatably mounted on vertical stub shafts supported in the brackets 18 and 19 respectively secured on the outside of the housing, the two pulleys 20 and 21 being positioned approximately at the same height from the bottom of the housing. All the pulleys have V-shaped or U-shaped peripheral grooves to accommodate an endless element such as a cable, which element in its course passes successively around all the pulleys in the manner hereinafter explained. Movement of the endless element or cable 26 is produced by its frictional engagement with the driven pulleys of the device, for example, with the pulleys 17 keyed to the driven shaft 13, and the moving cable in turn produces rotation in unison of the remaining pulleys in the device.

The course of the endless moving element or cable 26 can be briefly explained with reference to Figs. 1, 2 and 3. Starting, for example, with the outside pulley 21, as viewed in Fig. 1, the cable 26 passes around the pulley 21 in counter-clockwise direction, tangentially engages a pulley on the shaft 14 and similarly a pulley on the shaft 13, then passes around the outside pulley 20 on the other end of the housing, again tangentially engages the same pulley on shaft 13, then proceeds to a pulley on the next level of shaft 14, passes around the latter, then passes around the next higher pulley on shaft 13, and continues in this manner, passing around successively higher pulleys alternately on the shafts 14 and 13, until reaching the top pulleys of this tier within the housing. Thence the cable 26 passes from the top pulley 17 on shaft 13 to the corresponding top pulley on the shaft 15. From there the cable passes to the top pulley on shaft 16 and then proceeds in downward succession alternately around the pulleys on the shafts 15 and 16 until reaching the bottom pulley on the shaft 16. From the bottom pulley on shaft 16 the cable passes to the bottom pulley on shaft 14 and then proceeds in upward succession on the pulleys on the shafts 13 and 14 until it reaches the level of the pulley 21, whereupon the course of the endless cable begins anew. Thus the entire course of the cable, except during its passage around the external pulleys 21 and 20, is confined within the housing 10. Nevertheless, as will be apparent, with a compact arrangement of the pulleys it is possible to accommodate a long length of cable within the housing of only moderate size. For example, I have found that a convenient size dough proofing device in the form which I have illustrated can be mounted in a housing having external dimensions of approximately 3 feet in width, 7½ feet in length, and 5½ feet in height. Using pulleys of 8 inches in diameter, 30 pulleys can be conveniently mounted on each of the four vertical shafts 13, 14, 15 and 16. With such arrangement the total length of cable will be approximately 850 feet.

At equally spaced intervals along the cable 26 dough carriers 27 are mounted. Preferably these carriers are substantially circular in shape having an extending arm portion (see Fig. 6) which terminates in a hinge loop 30, which loop fits around the cable 26, causing each carrier 27 to be pivotally mounted on the cable 26. In order to prevent any side slipping of the dough carriers with respect to the cable on which they are hinged, I secure ring clamps 31 on the cable at both sides of the hinges loop 30 of each carrier. These ring clamps may be secured to the cable in any suitable manner and I have found it sufficient to pinch them tightly on the cable.

While the dough carriers 27 may be made in various ways, I prefer to make them out of plastic or similar material formed in an integral mold with the top surface of the carrier being slightly concaved and formed with perforations 28 (as illustrated in Fig. 6). A pair of flanges 29 at diametrically opposite sides extend down below the underside of the carrier, the purpose of which will be presently explained.

A rod-like track 22 for the dough carriers extends along through the device in parallel spaced relationship with respect to the traveling cable 26. This track 22 is supported by a series of bracket arms 25 (Fig. 1) secured on the inside of the housing 10. The track 22 is continuous throughout its extent except at one point which is shown located near the external pulley 21 (Figs. 1 and 4). At this point the track breaks off leaving an end 23 which is succeeded by a track portion 24 positioned immediately below and inwardly with respect to the end 23 and the cable 26.

As will now be apparent, the dough carriers 27, attached to the cable 26, slide along the track 22. The two downwardly extending flanges 29 on each dough carrier rest on the track and serve as supporting slide runners for each dough carrier on the track. As each dough carrier passes the end 23 of the track it swings down into substantially vertical position and its flanges or runners 29 then come into engagement with the succeeding track portion 24, as illustrated in Figs. 4 and 5. This track portion 24 then leads upwardly and outwardly, as shown, until it assumes the normal track position relative to the cable and thus quickly lifts the dough carrier back to its regular traveling position.

The individual pieces or rings of doughnut dough are delivered into a suitable hopper, indicated at 35 in Figs. 1 and 2, which has a discharging mouth located directly above the traveling dough carriers as they pass from the external pulley 20. By suitable means, which is not shown since this does not constitute part of the present invention, the individual pieces or rings of dough are caused to be discharged from the hopper on to the dough carriers successively and with proper timing so that a piece or ring of dough is delivered on to each dough carrier as it appears below the mouth of the hopper and as the dough carriers pass from the pulley 20. As a result, each piece or ring of dough is then carried along for approximately the entire course of the cable 26, the length of which course corresponds to the length of the cable, until the dough carrier reaches the end 23 of the track. At this point the downward swing of the dough carrier from the end 23 of the track causes the piece of dough to slide off the carrier and drop into a vessel, indicated at 36 in Figs. 1 and 2, in which boiling fat or oil is maintained for frying the doughnuts.

Finally, by means not shown and not included in this invention, the fried doughnuts are removed from the frying fat or oil.

In the particular size, which, as previously mentioned, I have found it most convenient to make my doughnut dough proofing device, and in which the total cable length is approximately 850 feet, I employ a total of 2400 dough carriers, thus spacing the carriers a little more than 4 inches apart on center. By maintaining the speed at which the cable 26 is driven so that the dough carriers will pass beneath the discharging mouth of the hopper 35 at the rate of 60 per minute, the speed which I have found to be generally most satisfactory, each dough piece will require about 40 minutes to complete its travel through the machine. In other words, each piece or ring of the doughnut dough is given a proofing, or allowed to rise, for a period of 40 minutes from its delivery from the hopper 35 until being discharged into the frying fat or oil. Consequently doughnuts are delivered at the rate of 60 per minute or 2400 each 40 minutes and each ring of the doughnut dough is given a predetermined period of 40 minutes for proofing or rising before being fried. By the various means heretofore employed in bakeries for handling raised doughnut dough rings the proofing of 2400 dough rings for a period of 40 minutes has required many times the amount of space occupied by my device, if my device is made in the size mentioned by way of illustration. Also, a certain amount of manual labor has heretofore been required to take care of the doughnut manufacturing which is performed by my device mechanically and automatically.

Obviously the length of the proofing period can easily be modified by changing the rate of speed by which the cable 26 is driven that is, the speed at which the driven shaft 13 is rotated and thus the length of time required for each piece of dough to pass through the device.

In the manufacture of raised doughnuts it is desirable that as much as possible of the surface of the dough rings should be exposed to the air during the proofing period. The reason for this is that a sealing film of a sort forms on the outer surface of the dough as the result of the contact with the air, and this sealing film on the outer surface of the dough prevents the boiling fat or oil in which the doughnut is fried from penetrating too far into the doughnut during the frying. Were it not for this protetive film on the dough in the case of raised doughnuts too much grease would be absorbed into the doughnuts which would cause them to be heavy and less palatable. In order to enable the maximum surface of the doughnut dough ring to have full contact with the air during the proofing period, I perforate the portion 28 of the dough carriers on which the dough rests (see Fig. 6). I have found, however, that the perforations must not be too large nor too close together, otherwise the dough will drop down slightly in the perforations with the result that at the end of the proofing period the dough will have a tendency to stick to the carrier instead of sliding freely from the carrier when the carrier is swung down to discharging position. Thus on this account I have found that it is unsatisfactory to use wire screen or metal mesh to constitute the dough supporting surface of the dough carriers. Most satisfactory results I have found are obtained with dough carriers formed from molded plastic substantially as illustrated. The dough carriers when made in this form are also light in weight, ample in strength and inexpensive to manufacture.

Numerous modifications can of course be made in the particular proofing device which I have illustrated and described, without departing from the principle of my invention, but the particular form which I have described and illustrated for my proofing device I consider as the preferred embodiment of my invention, as previously indicated.

I claim:

1. In a dough proofing device of the character described including a housing, a pair of vertical shafts mounted in said housing, a plurality of identical pulleys mounted on each shaft, the pulleys on said shafts constituting corresponding tiers, an endless flexible element engaging all of said pulleys and arranged to pass around each tier of pulleys successively, means for moving said flexible element at a predetermined rate of speed, a single track paralleling said flexible element and spaced a slight distance from said flexible element and on a level with said flexible element throughout its entire course except at one point where said track is discontinued to provide a sudden drop-off, a plurality of identical equally-spaced dough carriers, each carrier having a lateral arm portion hinged on said flexible element, means holding each of said carriers from sliding longitudinally with respect to said flexible element, said carriers resting centrally on and sliding along said track while being held balanced on said track and pulled along by said flexible element, each of said carriers swinging suddenly and momentarily from horizontal position to vertical position when reaching said drop-off point of said track, and an inclined portion of said track starting below said flexible element at said drop-off point and leading upwardly and outwardly until reaching the normal position of said track with respect to said flexible element to cause each of said carriers to swing back up to normal horizontal position of travel while being pulled along over said inclined portion of said track, whereby pieces of dough when deposited on said carriers after said carriers have passed beyond said inclined portion of said track will be carried along for the length of time required for said flexible element to complete its course up to said drop-off point and will then be discharged from said carriers at said drop-off point.

2. In a dough proofing device of the character described including a housing, a plurality of vertical shafts mounted in said housing, a plurality of identical pulleys mounted on each shaft, the pulleys on said shafts constituting tiers, an additional pulley mounted on the outside of said housing, an endless flexible element engaging all of said pulleys and arranged to pass around each tier of pulleys successively, means for moving said flexible element at a predetermined rate of speed, a rod-like single track paralleling said flexible element and spaced a slight distance from said flexible element and on a level with said flexible element throughout its course except adjacent said outside additional pulley where said track is discontinued to provide a sudden drop-off, a plurality of identical equally-spaced dough carriers, each carrier having a lateral arm portion hinged on said flexible element, means holding each of said carriers from sliding longitudinally with respect to said flexible element, said carriers resting centrally on and sliding along said track while being held balanced on said track and pulled along by said flexible element, each of said carriers swinging suddenly and momentarily from horizontal position to vertical position when reaching said drop-off point of said track, and an inclined portion of said track starting below said flexible element at said drop-off point and leading upwardly and outwardly until reaching the normal position of said track with respect to said flexible element to cause each of said carriers to swing back up to normal horizontal position of travel while being pulled along over said inclined portion of said track, whereby pieces of dough when deposited on said carriers after said carriers have passed beyond said inclined portion of said track will be carried along in said housing for the length of time required for said flexible element to complete its course up to said drop-off point and will then be discharged from said carriers at said drop-off point at said outside pulley.

3. In a dough proofing device of the character described including a housing, a plurality of pairs of vertical shafts mounted in said housing, a plurality of identical pulleys mounted on each shaft, the pulleys on each pair of shafts constituting corresponding tiers, an additional pulley mounted on the outside of said housing, a second additional pulley mounted on the outside of said housing at another side of said housing from said first mentioned additional pulley and at substantially the same level, an endless cable engaging all of said pulleys and arranged to pass around each tier of pulleys on one pair of said shafts successively and then similarly around the tiers of pulleys on another pair of said shafts, and from said first mentioned outside pulley to said second mentioned outside pulley, means for moving said cable at a predetermined rate of speed, a rod-like track paralleling said cable and spaced a slight distance from said cable and on a level with said cable throughout its course except adjacent said first mentioned outside additional pulley where said track is discontinued to provide a sudden drop-off, a plurality of identical equally-spaced dough carriers, each carrier having a lateral arm portion hinged on said cable, means holding each of said carriers from sliding longitudinally with respect to said cable, said carriers resting centrally on and sliding along said track while being held balanced on said track and pulled along by said cable, each of said carriers swinging suddenly and momentarily from horizontal position to vertical position when reaching said drop-off point of said track, and an inclined portion of said track starting below said cable at said drop-off point and leading upwardly and outwardly until reaching the normal position of said track with respect to said cable to cause each of said carriers to swing back up to normal horizontal position of travel while being pulled along over said inclined portion of said track, whereby pieces of dough when deposited on said carriers as said carriers pass around said second mentioned outside pulley will be carried along in said housing for the length of time required for said cable to complete its course up to said drop-off point and will then be discharged from said carriers at said drop-off point at said first mentioned outside pulley.

HERBERT C. RHODES.

References Cited in the file of this patent

UNITED STATES PATENTS

| Number | Name | Date |
| --- | --- | --- |
| 1,127,000 | Hicks | Feb. 2, 1915 |
| 1,226,592 | Privett | May 15, 1917 |
| 1,334,025 | Embrey | Mar. 16, 1920 |
| 2,017,046 | Hanna | Oct. 15, 1935 |
| 2,027,266 | Bogaty | Jan. 7, 1936 |
| 2,144,182 | Ellis | Jan. 17, 1939 |
| 2,516,499 | Albright | July 25, 1950 |